United States Patent
Kim et al.

(10) Patent No.: US 9,704,602 B2
(45) Date of Patent: Jul. 11, 2017

(54) RANDOM NUMBER GENERATION CIRCUIT AND SEMICONDUCTOR SYSTEM INCLUDING THE SAME

(71) Applicant: SK hynix Inc., Icheon-si Gyeonggi-do (KR)

(72) Inventors: Kyung Hoon Kim, Icheon-si (KR); In Sik Yoon, Icheon-si (KR)

(73) Assignee: SK hynix Inc., Icheon-si (KR)

(*) Notice: Subject to any disclaimer, the term of this patent is extended or adjusted under 35 U.S.C. 154(b) by 128 days.

(21) Appl. No.: 14/924,818

(22) Filed: Oct. 28, 2015

(65) Prior Publication Data

US 2017/0018317 A1   Jan. 19, 2017

(30) Foreign Application Priority Data

Jul. 14, 2015 (KR) .................. 10-2015-0099862

(51) Int. Cl.
| | |
|---|---|
| *G11C 29/04* | (2006.01) |
| *G11C 29/00* | (2006.01) |
| *G11C 17/16* | (2006.01) |
| *H04L 9/08* | (2006.01) |
| *G06F 7/58* | (2006.01) |
| *G11C 29/44* | (2006.01) |

(52) U.S. Cl.
CPC ............. *G11C 29/76* (2013.01); *G06F 7/588* (2013.01); *G11C 17/16* (2013.01); *H04L 9/0869* (2013.01); *G06F 2207/58* (2013.01); *G11C 2029/4402* (2013.01); *H04L 2209/24* (2013.01)

(58) Field of Classification Search
CPC ......... G06F 7/582; G06F 7/588; H04L 9/0869
USPC ........................................... 708/205
See application file for complete search history.

(56) References Cited

U.S. PATENT DOCUMENTS

| | | | | |
|---|---|---|---|---|
| 6,051,509 | A | * 4/2000 | Tsuchiaki | .......... H01L 21/26506 257/E21.143 |
| 2006/0080572 | A1 | * 4/2006 | Fong | ..................... G11C 29/808 714/6.13 |
| 2011/0267908 | A1 | * 11/2011 | Kim | ..................... G11C 29/785 365/200 |
| 2015/0293748 | A1 | * 10/2015 | Falk | ........................ G06F 7/582 713/193 |

FOREIGN PATENT DOCUMENTS

KR   10-0812850 B1   3/2008

* cited by examiner

*Primary Examiner* — Andrew Caldwell
*Assistant Examiner* — Omar Dominguez
(74) *Attorney, Agent, or Firm* — William Park & Associates Ltd.

(57) ABSTRACT

A random number generation circuit may include a memory block. The random number generation circuit may include a fuse block configured to store an address of a failed memory cell from a memory cell array of the memory block, as a repair address, and generate a match signal by comparing the repair address with a normal address inputted from an exterior. The random number generation circuit may include a register configured to output a true random number by latching an address corresponding to activation timing of the match signal among normal addresses.

25 Claims, 3 Drawing Sheets

RANDOM NUMBER GENERATION CIRCUIT AND SEMICONDUCTOR SYSTEM INCLUDING THE SAME

CROSS-REFERENCES TO RELATED APPLICATION

The present application claims priority under 35 U.S.C. §119(a) to Korean application number 10-2015-0099862, filed on Jul. 14, 2015, in the Korean Intellectual Property Office, which is incorporated herein by reference in its entirety.

BACKGROUND

1. Technical Field

Various embodiments generally relate to a semiconductor circuit, and, more particularly, to a random number generation circuit and a semiconductor system including the random number generation circuit.

2. Related Art

A semiconductor circuit, for example, a semiconductor memory such as a DRAM may be used in the type of a semiconductor system, such as a system-in-package, a multi-chip package or a system-on-chip. In a semiconductor system the semiconductor circuit may be selectively coupled with various semiconductor devices such as a graphic chip, an audio chip or/and a microprocessor.

In such a semiconductor system, the demand for encryption for data communication has increased, and thus, random and unpredictable arbitrary numbers, that is, random numbers are needed for an encryption algorithm.

SUMMARY

In an embodiment, a random number generation circuit may be provided. The random number generation circuit may include a memory block, and a fuse block configured to store an address of a failed memory cell from a memory cell array of the memory block, as a repair address, and generate a match signal by comparing the repair address with a normal address inputted from an exterior. The random number generation circuit may include a register configured to output a true random number by latching an address corresponding to activation timing of the match signal among normal addresses.

In an embodiment, a semiconductor system may be provided. The semiconductor system may include a substrate, and a semiconductor memory disposed in a first region over the substrate, and configured to generate a true random number by using an address value of a failed memory cell. The semiconductor system may include a processor disposed in a second region over the substrate, and configured to perform data encryption communication inside a package or data encryption communication with a host located outside the package, by using the true random number.

The semiconductor memory may include a logic chip and a plurality of memory chips sequentially stacked over the logic chip. The logic chip and the plurality of memory chips may be electrically coupled through through vias, and any one of the plurality of memory chips may generate the true random number and transmit the generated true random number to the logic chip through the through vias.

In an embodiment, a semiconductor system may be provided. The semiconductor system may include a substrate. The semiconductor system may include a semiconductor memory disposed in a first region over the substrate, and including a logic chip and a plurality of memory chips which are stacked over the logic chip. The semiconductor system may include a processor disposed in a second region over the substrate, and configured to perform data encryption communication inside a package or data encryption communication with a host outside the package, by using a true random number. Any one of the plurality of memory chips may is provide a match signal generated by comparing a repair address and a normal address inputted from an exterior of the semiconductor memory, to the logic chip. The logic chip may be configured to output the true random number by latching an address corresponding to the match signal among normal addresses.

In an embodiment, a random number generation circuit may be provided. The random number generation circuit may include a memory block including a memory cell array and a fuse block configured to store an address of a failed memory cell from a memory cell array as a repair address. The random number generation circuit may include a register configured to output a value of the repair address as a true random number.

DETAILED DESCRIPTION

Hereinafter, a random number generation circuit and a semiconductor system including the same will be described below with reference to the accompanying drawings through various examples of embodiments.

Various embodiments may be directed to a random number generation circuit capable of generating random numbers by itself without using a separate random number generator, and a semiconductor system including and/or using the same.

According to the various embodiments, a semiconductor system having a random number generation function using a semiconductor memory without a separate random number generator may be realized, and encrypted data communication with an internal or/and external system may be possible.

Figure 1:
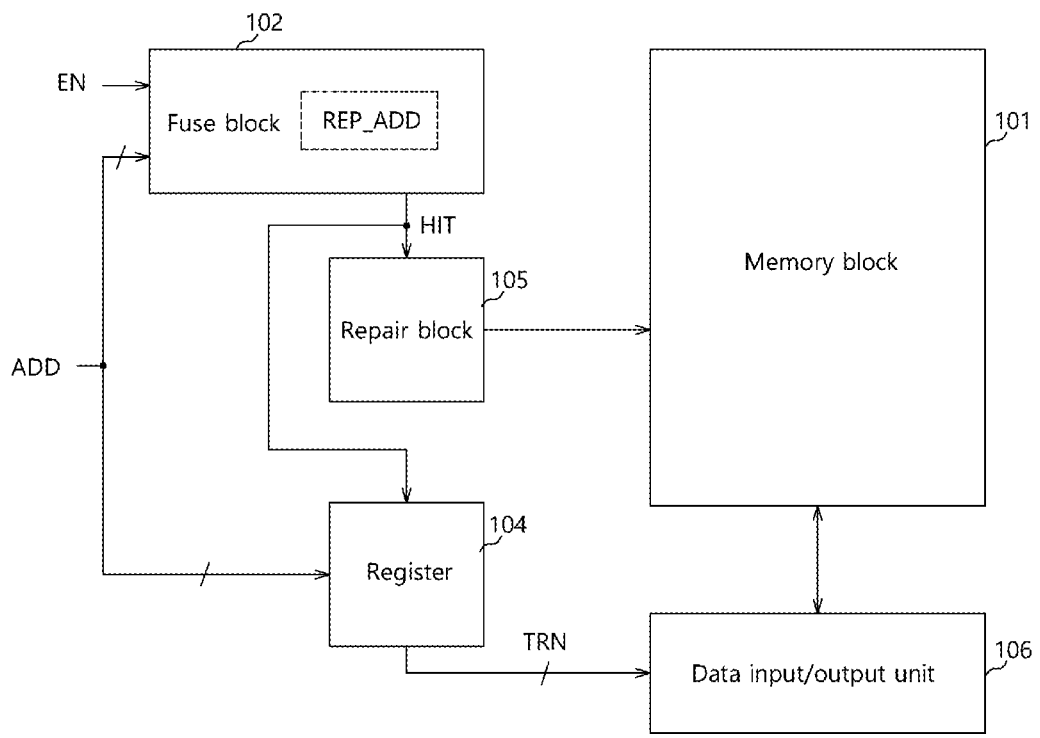
FIG. 1 is a diagram illustrating a representation of an example of the configuration of a semiconductor memory 100 including a random number generation circuit in accordance with an embodiment.

Referring to FIG. 1, a semiconductor memory 100 may include a random number generation circuit in accordance with an embodiment. The random number generation circuit may include a memory block 101, a fuse block 102, a register 104, a repair block 105, and a data input/output unit 106. In an embodiment, the semiconductor memory 100 may include a memory block 101, a fuse block 102, a register 104, a repair block 105, and a data input/output unit 106.

The memory block 101 may include a memory cell array, and a driver and a sense amplifier for writing data in the memory cell array and reading out data from the memory cell array.

The fuse block 102 may store the address of a memory cell in which a fail has occurred, in the memory cell array of the memory block 101, as a repair address REP_ADD.

The fuse block 102 may compare the repair address REP_ADD with a normal address ADD inputted from an exterior of the semiconductor memory 100, according to an enable signal EN, and may generate a match signal HIT when the repair address REP_ADD matches with the normal address ADD.

The repair block 105 may perform an operation for replacing the memory cell in which the fail has occurred, in the memory cell array of the memory block 101, with a redundant memory cell, according to the match signal HIT.

The register 104 may output a true random number TRN by latching an address corresponding to the activation timing of the match signal HIT among the normal addresses ADD inputted from the exterior.

In this regard, fails of memory cells in the memory cell array of the memory block 101 do not occur according to a predetermined rule, but occur randomly.

Accordingly, since the address of a memory cell in which a fail occurs, that is, the repair address REP_ADD also has a random characteristic, in an embodiment, the value of the repair address REP_ADD may be used as the true random number TRN.

The data input/output unit 106 may perform an operation of processing the input/output data of the memory block 101.

The data input/output unit 106 may output the true random number TRN outputted from the register 104, to the exterior of the semiconductor memory 100 through the input/output terminal (for example, DQ) of the data input/output unit 106.

The data input/output unit 106 may perform output data encryption by encoding the output data of the memory block 101 and the true random number TRN.

The data input/output unit 106 may decode the data inputted by being encrypted from the exterior, by using the true random number TRN.

While not illustrated, the data input/output unit 106 may include input/output terminals, an encoder for encoding output data or/and a decoder for decoding input data.

Figure 2:
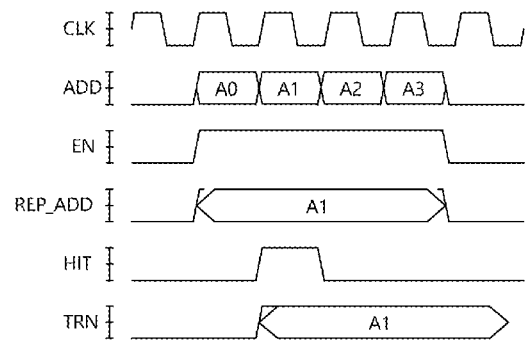
FIG. 2 is a representation of an example of a timing diagram to assist in the explanation of operations of the random number generation circuit in accordance with an embodiment.

The true random number generation operation of the semiconductor memory 100 in accordance with an embodiment will be described below with reference to FIG. 2.

Normal addresses ADD may be inputted as different values such as A0, A1, A2 and A3, from the exterior.

At least one repair address REP_ADD is stored in the fuse block 102. For example, the repair address REP_ADD may have the value of A1.

As the enable signal EN is activated, the operation of the fuse block 102 is performed, and, as the normal address ADD having the value of A1 the same as the repair address REP_ADD is inputted, the match signal HIT may be generated.

The register 104 may store the normal address ADD having the value of A1, corresponding to the timing at which the match signal HIT is generated, as the true random number TRN, and may provide the true random number TRN to the data input/output unit 106.

Figure 3:
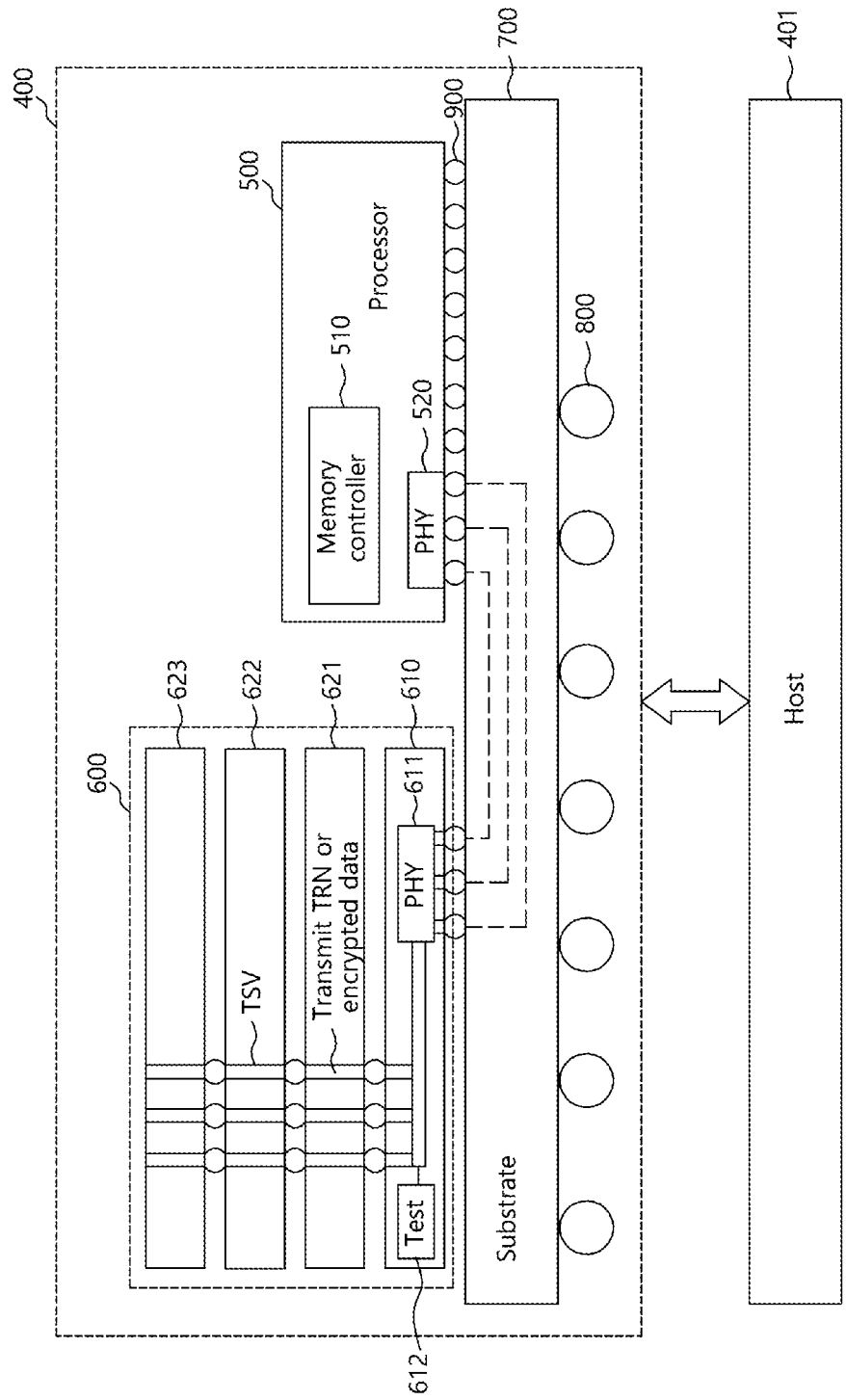
FIG. 3 is a diagram illustrating a representation of an example of the configuration of a semiconductor system 400 in accordance with an embodiment.

As illustrated in FIG. 3, a semiconductor system 400 in accordance with an embodiment may include a substrate 700, a stacked semiconductor memory 600, and a processor 500.

The semiconductor system 400 may be realized in the type of a system-in-package, a multi-chip package or a system-on-chip, and may be realized in the type of a package-on-package which includes a plurality of packages.

The substrate 700 may provide signal paths for smooth data communication between the processor 500 and the stacked semiconductor memory 600, and may include an additional logic circuit for providing the signal paths and a logic circuit for a test.

The substrate 700 may be realized in various types such as of an interposer and a PCB (printed circuit board). The signal paths provided by the substrate 700 may include electrical coupling paths such as metal layers or through-silicon vias.

The substrate 700 may be electrically coupled with an external device through package balls 800 such as, for example but not limited to, a ball grid array, bump balls and C4 bumps. The external device may be a host 401 configured to operate by being electrically coupled with the semiconductor system 400.

The substrate 700 may be electrically coupled with the processor 500 and the stacked semiconductor memory 600 through micro bumps 900.

The processor 500 may communicate with the host 401 through a system bus (not illustrated) and the substrate 700, and may perform various calculation operations required by the host 401.

The processor 500 may include, for example but not limited to, at least one among a central processing unit (CPU), a graphic processing unit (GPU), a multimedia processor (MMP) and a digital signal processor (DSP).

The processor 500 may be realized in the types of a system-on-chip, a system-in-package and a package-on-package in which processor chips having various functions, such as application processors (AP), are combined.

The processor 500 may access the stacked semiconductor memory 600 through a memory controller 510.

The signals exchanged between a physical layer PHY 520 of the memory controller 510 and a physical layer PHY 611 of the stacked semiconductor memory 600 may be converted in conformity with the interface between them.

While FIG. 3 illustrates an example in which the memory controller 510 is disposed in the processor 500, it is to be noted that, as the case may be, the memory controller 510 may be separately disposed outside the processor 500.

The memory controller 510 may be stacked as any one chip (a base chip or a logic chip) of the stacked semiconductor memory 600.

The memory controller 510 may be separately stacked on the substrate 700 by being separated from the stacked semiconductor memory 600 and the processor 500.

The memory controller 510 may provide a command, an address, a clock and data to the stacked semiconductor memory 600 to control the stacked semiconductor memory 600, and may receive the data outputted from the stacked semiconductor memory 600.

The physical layers 520 and 611 may be interface circuits which convert a signal transmitted from the processor 500 or the memory controller 510 into a signal appropriate to be used in the stacked semiconductor memory 600 and output the converted signal or which convert a signal transmitted from the stacked semiconductor memory 600 into a signal appropriate to be used in the processor 500 or the memory controller 510.

The stacked semiconductor memory 600 may be a stacked memory device which includes a plurality of stacked chips.

The stacked semiconductor memory 600 may include a logic chip 610 and a plurality of memory chips 621 to 623 which are sequentially stacked on the logic chip 610.

The logic chip 610 and the plurality of memory chips 621 to 623 may be electrically coupled through through vias TSV and micro bumps 900.

The logic chip 610 may relay signal and data transmission between the memory controller 510 and the plurality of memory chips 621 to 623.

The logic chip 610 may include the physical layer 611, a test circuit 612 and a repair-related circuit (not illustrated).

The physical layer 611 may receive a signal and data transmitted through the processor 500 or the memory controller 510 and the physical layer 520, and may amplify signals and data outputted from the plurality of memory chips 621 to 623 and transmit the amplified signals and data to the physical layer 520.

The test circuit 612 may perform tests for the plurality of memory chips 621 to 623 by being electrically coupled with the processor 500 or the memory controller 510, or may perform tests for the plurality of memory chips 621 to 623 by being electrically coupled with the host 401, for example, test equipment. Also, the test circuit 612 may perform an independent test for the stacked semiconductor memory 600.

The test circuit 612 may include circuits which may perform tests associated with the plurality of memory chips 621 to 623 and the logic chip 610 at a wafer level and a package level.

The test circuit 612 may include various memory test-related circuits such as, for example but not limited to, a built-in self test circuit, a self repair circuit and a self stress circuit.

The test circuit 612 may perform, for example but not limited to, a test of through vias or micro bumps, a boundary scan test, a burn-in stress test, a data input/output test, a data compression test, and so on.

The test circuit 612 may include a repair logic which replaces a failed memory cell with a redundancy memory cell.

The plurality of memory chips 621 to 623 may respectively have data storage spaces for storing the data transmitted through the logic chip 610 from the processor 500 or the memory controller 510.

The plurality of memory chips 621 to 623 may further include logic circuits for performing tests linked with the test circuit 612 of the logic chip 610.

Any one or all of the plurality of memory chips 621 to 623 may be configured in the same way as the semiconductor memory 100 described above with reference to FIG. 1.

A true random number TRN generated by any one, for example, the memory chip 621, among the plurality of memory chips 621 to 623 may be transmitted to the logic chip 610 through a through via TSV.

The logic chip 610 may transmit the true random number TRN transmitted from the memory chip 621, to the processor 500 through the physical layer 611.

The processor 500 may perform internal data encryption communication or data encryption communication with the host 401, by using the true random number TRN received through its physical layer 520.

In an embodiment, instead of transmitting the true random number TRN generated by itself, to the logic chip 610, the memory chip 621 may transmit encryption data directly encrypted by itself by using the true random number TRN, to the logic chip 610 through a through via TSV.

The logic chip 610 may transmit the encryption data transmitted from the memory chip 621, to the processor 500 through the physical layer 611.

While the above descriptions illustrate an example of a method for directly performing data encryption by the memory chip 621, it may be envisaged that the memory chip 621 transmits a true random number TRN to the logic chip 610 and the logic chip 610 generates encryption data by using the true random number TRN.

If a repair limit is exceeded by fails, it may be impossible to use a corresponding memory chip.

However, in an embodiment, a memory chip having exceeded a repair limit may be used as a random number generation chip.

A semiconductor system including a plurality of memory chips and a processor, such as a system-in-package, a multichip package or a system-on-chip, may include a separate random number generation chip.

In an embodiment, since a memory chip has by itself a random number generation function, a separate random number generation chip is not needed.

Figure 4:
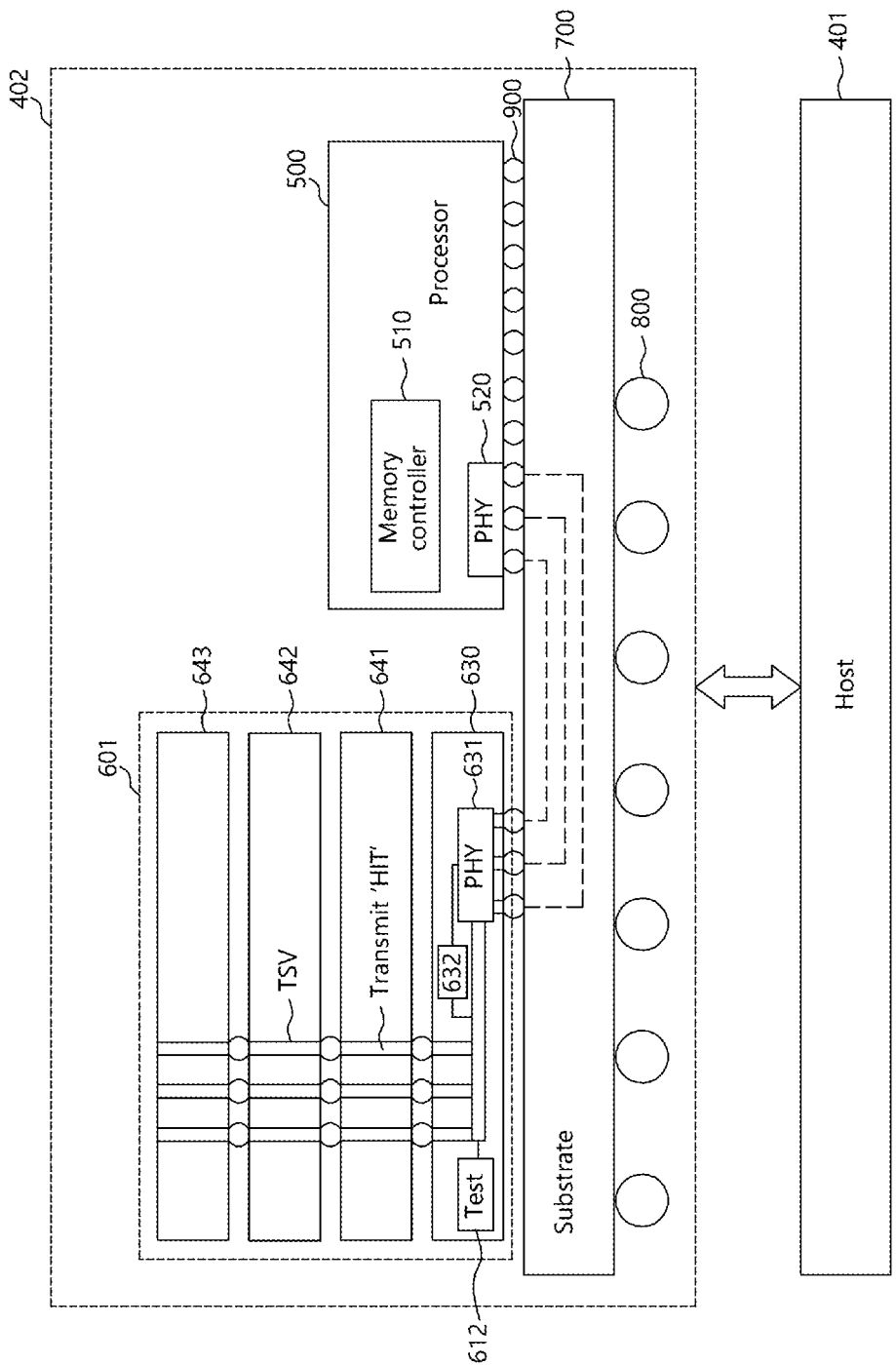
FIG. 4 is a diagram illustrating a representation of an example of the configuration of a semiconductor system 402 in accordance with an embodiment.

As illustrated in FIG. 4, a semiconductor system 402 in accordance with an embodiment may include a substrate 700, a stacked semiconductor memory 601, and a processor 500.

In the semiconductor system 402 in accordance with other embodiments, the remaining components except the stacked semiconductor memory 601 may be configured in the same way as those of the semiconductor system 400 described above with reference to FIG. 3.

Therefore, descriptions for the remaining components except the stacked semiconductor memory 601 will be omitted herein.

The stacked semiconductor memory 601 may be a stacked memory device including a plurality of stacked chips.

The stacked semiconductor memory 601 may include a logic chip 630 and a plurality of memory chips 641 to 643 which are sequentially stacked on the logic chip 630.

The logic chip 630 and the plurality of memory chips 641 to 643 may be electrically coupled through through vias TSV and micro bumps 900.

The logic chip 630 may relay signal and data transmission between the memory controller 510 and the plurality of memory chips 641 to 643.

The logic chip 630 may include a physical layer 631, a test circuit 612, a register 632 and a repair-related circuit (not illustrated).

The physical layer 631 may receive a signal and data transmitted through the processor 500 or the memory controller 510 and the physical layer 520, and may amplify signals and data outputted from the plurality of memory chips 641 to 643 and transmit the amplified signals and data to the physical layer 520.

The test circuit 612 may be configured in substantially the same way as the test circuit 612 of the semiconductor system 400 described above with reference to FIG. 3. Therefore, corresponding descriptions will be omitted herein.

The plurality of memory chips 641 to 643 may respectively have data storage spaces for storing the data transmitted through the logic chip 630 from the processor 500 or the memory controller 510.

The plurality of memory chips 641 to 643 may further include logic circuits for performing tests in link with the test circuit 612 of the logic chip 630.

One or more of the plurality of memory chips 641 to 643 may be configured in substantially the same way as a configuration which is obtained by excluding the register 104 from the configuration of the semiconductor memory 100 described above with reference to FIG. 1.

The fuse block of any one, for example, the memory chip 641, among the plurality of memory chips 641 to 643 may transmit the match signal HIT generated in the example where the repair address REP_ADD and a normal address ADD inputted from an exterior match each other, to the logic chip 630 through a through via TSV.

The logic chip 630 may include the register 632. The register 632 may perform substantially the same role as the register 104 of the semiconductor memory 100 described above with reference to FIG. 1.

By using the register 632, the logic chip 630 may output a true random number TRN by latching an address corresponding to the activation timing of the match signal HIT among the normal addresses ADD inputted from the exterior.

Since the logic chip 630 performs the role of interfacing the stacked semiconductor memory 601 with the exterior, the logic chip 630 may be provided with data, an address ADD and so on from the host 401 or the processor 500.

Thus, the logic chip 630 may transmit the true random number TRN to the processor 500 through the physical layer 631.

The processor 500 may perform internal data encryption communication or data encryption communication with the host 401, by using the true random number TRN received through its physical layer 520.

A semiconductor system including a plurality of memory chips and a processor, such as a system-in-package, a multichip package or a system-on-chip, may include a separate random number generation chip.

In an embodiment, since the stacked semiconductor memory 601 has by itself a random number generation function, a separate random number generation chip is not needed.

While various embodiments have been described above, it will be understood to those skilled in the art that the embodiments described are examples only. Accordingly, the random number generation circuit and the semiconductor system using the same described herein should not be limited based on the described embodiments.

What is claimed is:

1. A random number generation circuit comprising:
   a memory block;
   a fuse block configured to store an address of a failed memory cell from a memory cell array of the memory block, as a repair address, and generate a match signal by comparing the repair address with a normal address inputted from an exterior; and
   a register configured to output a true random number by latching an address corresponding to activation timing of the match signal among normal addresses.

2. The random number generation circuit according to claim 1, further comprising:
   a repair processing block configured to replace the failed memory cell in the memory cell array of the memory block, with a redundant memory cell, according to the match signal.

3. The random number generation circuit according to claim 1, further comprising:
   a data input/output unit configured to process input/output data of the memory block, and output the true random number to an exterior of a semiconductor memory through an input/output terminal,
   wherein the random number generation circuit is included in a semiconductor memory.

4. The random number generation circuit according to claim 1, further comprising:
   a data input/output unit configured to perform output data encryption by encoding output data of the memory block and the true random number.

5. The random number generation circuit according to claim 1, further comprising:
   a data input/output unit configured to decode data inputted by being encrypted from an exterior, by using the true random number.

6. The random number generation circuit according to claim 1, wherein during an activated enable signal received by the fuse block, the fuse block generates the match signal in response to the normal address having the same value as the repair address.

7. A semiconductor system comprising:
   a substrate;
   a semiconductor memory disposed in a first region over the substrate, and configured to generate a true random number by using an address value of a failed memory cell; and
   a processor disposed in a second region over the substrate, and configured to perform data encryption communication inside a package or data encryption communication with a host located outside the package, by using the true random number.

8. The semiconductor system according to claim 7, wherein the semiconductor memory includes one or more memory chips stacked therein.

9. The semiconductor system according to claim 7, wherein the semiconductor memory includes one or more memory chips stacked therein, and
   wherein each memory chip comprises:
   a memory block;
   a fuse block configured to store an address of a failed memory cell from a memory cell array of the memory block, as a repair address, and generate a match signal by comparing the repair address with a normal address inputted from an exterior; and
   a register configured to output a true random number by latching an address corresponding to activation timing of the match signal among normal addresses.

10. The semiconductor system according to claim 9, each memory chip further comprises:
    a repair processing block configured to replace the failed memory cell in the memory cell array of the memory block, with a redundant memory cell, according to the match signal.

11. The semiconductor system according to claim 9, each memory chip further comprises:
    a data input/output unit configured to process input/output data of the memory block, and output the true random number to an exterior of the semiconductor memory through an input/output terminal.

12. The semiconductor system according to claim 9, each memory chip further comprises:
    a data input/output unit configured to perform output data encryption by encoding output data of the memory block and the true random number.

13. The semiconductor system according to claim 9, each memory chip further comprises:
    a data input/output unit configured to decode data inputted by being encrypted from the exterior of the semiconductor memory, by using the true random number.

14. The semiconductor system according to claim 9, wherein during an activated enable signal received by the fuse block, the fuse block generates the match signal in response to the normal address having the same value as the repair address.

15. The semiconductor system according to claim 7,
wherein the semiconductor memory includes a logic chip and a plurality of memory chips which are sequentially stacked over the logic chip,
wherein the logic chip and the plurality of memory chips are electrically coupled through through vias, and
wherein any one of the plurality of memory chips generates the true random number and transmits the generated true random number to the logic chip through the through vias.

16. A semiconductor system comprising:
a substrate;
a semiconductor memory disposed in a first region over the substrate, and including a logic chip and a plurality of memory chips which are stacked over the logic chip; and
a processor disposed in a second region over the substrate, and configured to perform data encryption communication inside a package or data encryption communication with a host outside the package, by using a true random number,
wherein any one of the plurality of memory chips provides a match signal, the match signal generated by comparing a repair address and a normal address inputted from an exterior of the semiconductor memory, to the logic chip, and
where the logic chip is configured to output the true random number by latching an address corresponding to the match signal among normal addresses.

17. The semiconductor system according to claim 16, wherein each memory chip comprises:
a memory block; and
a fuse block configured to store an address of a failed memory cell in a memory cell array of the memory block, as the repair address, and generate the match signal by comparing the repair address with the normal address.

18. The semiconductor system according to claim 17, wherein during an activated enable signal received by the fuse block, the fuse block generates the match signal in response to the normal address having the same value as the repair address.

19. The semiconductor system according to claim 17, wherein each memory chip further comprises:
a repair processing block configured to replace the failed memory cell with a redundant memory cell, according to the match signal.

20. The semiconductor system according to claim 16,
wherein the logic chip and the plurality of memory chips are electrically coupled through through vias, and
wherein any one of the plurality of memory chips generates the match signal and transmits the generated match signal to the logic chip through the through vias.

21. A random number generation circuit comprising:
a memory block including a memory cell array;
a fuse block configured to store an address of a failed memory cell from a memory cell array as a repair address; and
a register configured to output a value of the repair address as a true random number.

22. The random number generation circuit according to claim 21,
wherein the fuse block generates a match signal by comparing the repair address with a normal address, and
wherein the register outputs the true random number by latching an address corresponding to activation timing of the match signal among normal addresses.

23. The random number generation circuit according to claim 22, wherein the fuse block generates the match signal by comparing the repair address with the normal address inputted from an exterior of the random number generation circuit.

24. The random number generation circuit according to claim 23, wherein during an activated enable signal received by the fuse block, the fuse block generates the match signal in response to the normal address having the same value as the repair address.

25. The random number generation circuit according to claim 22, further comprising:
a repair processing block configured to replace the failed memory cell in the memory cell array of the memory block, with a redundant memory cell, according to the match signal.

* * * * *